No. 733,289. PATENTED JULY 7, 1903.
E. W. SILVER.
ENSILAGE MACHINE.
APPLICATION FILED APR. 10, 1902.
NO MODEL.
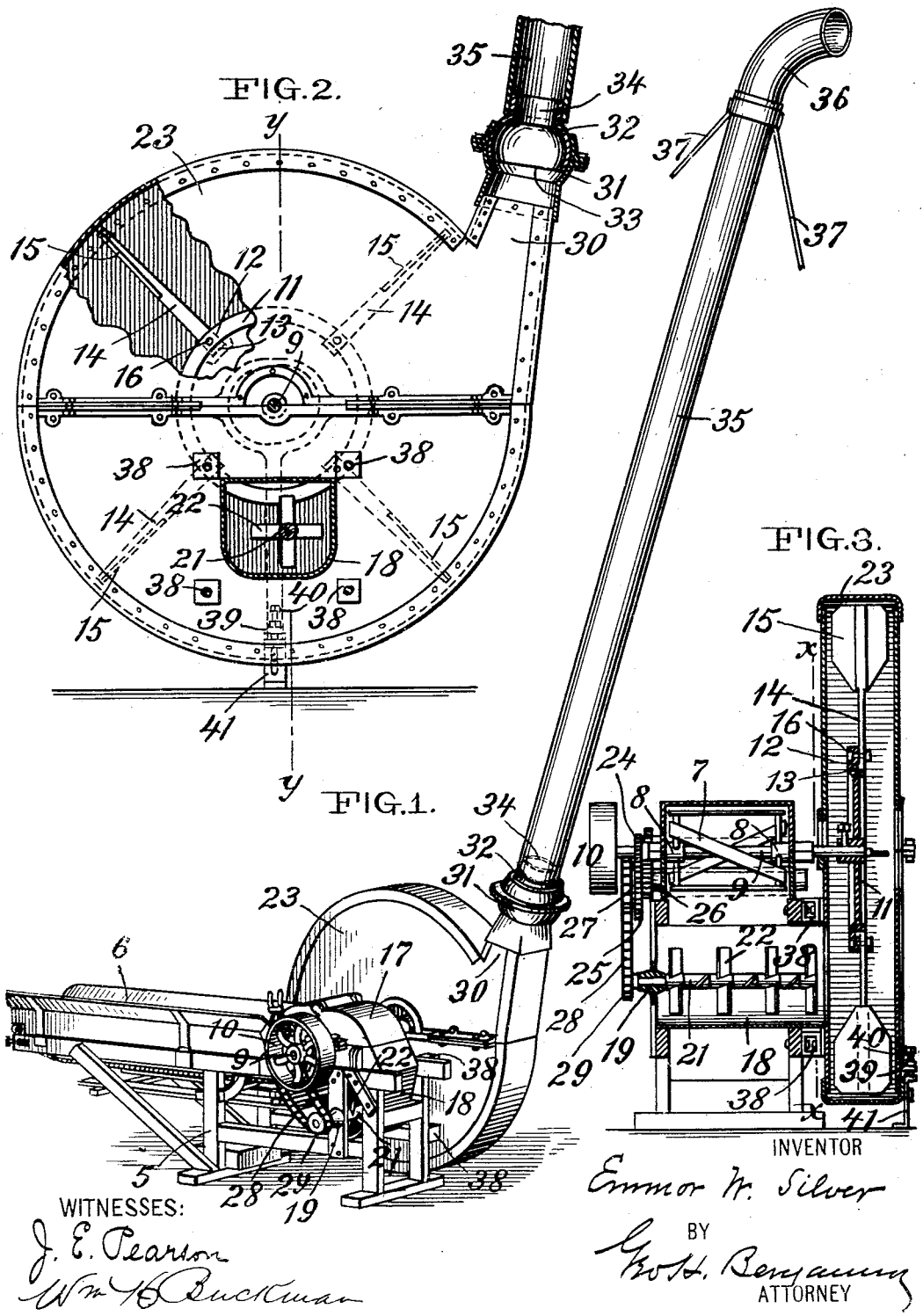
WITNESSES:
J. E. Pearson
Wm H. Buckman
INVENTOR
Emmor W. Silver
BY
Geo. H. Benjamin
ATTORNEY No. 733,289.

Patented July 7, 1903.

UNITED STATES PATENT OFFICE.

EMMOR W. SILVER, OF SALEM, OHIO, ASSIGNOR TO THE SILVER MANUFACTURING COMPANY, OF SALEM, OHIO.

ENSILAGE-MACHINE.

SPECIFICATION forming part of Letters Patent No. 733,289, dated July 7, 1903.

Application filed April 10, 1902. Serial No. 102,253. (No model.)

*To all whom it may concern:*

Be it known that I, EMMOR W. SILVER, a citizen of the United States, residing at Salem, county of Columbiana, State of Ohio, have invented certain new and useful Improvements in Ensilage-Machines, of which the following is a specification.

My invention relates to a machine for cutting and elevating ensilage.

The object of my invention is the construction of a machine which will cut all those substances commonly used for the production of ensilage and elevating such cut substances to any desired point.

A further object of my invention is to facilitate, through the employment of an automatically-acting machine, the handling of ensilage, thereby materially reducing the cost of producing and delivering ensilage.

The accompanying drawings will serve to illustrate my invention.

Figure 1 is a perspective of the assembled machine. Fig. 2 is a side elevation and partial section of the machine, taken on the line X X of Fig. 3. Fig. 3 is a vertical section taken on the line Y Y of Fig. 2.

In the drawings, 5 indicates a supporting-frame for the machine, which may be of any suitable construction. Mounted on the frame is a directing-trough 6, through which material to be cut is fed to the cutting-blades 7, Fig. 3, which are arranged spirally around the shaft. The blades may, however, be of any suitable construction and arranged in any required manner. In the construction shown four blades are employed, connected to hubs 8, mounted on shaft 9. These blades coact with suitable fixed cutting-blades (not shown) in the well-known manner. On the left-hand end of the shaft is a driving-pulley 10. On the right-hand end of the shaft is fixed a disk 11, which in a measure serves as a fly-wheel. Arranged equidistant along the outer edge of the disk 11 are radial grooves or sockets 12, adapted to receive the bent inner ends 13 of the arms 14, on the outer ends of which are arranged the blades 15. The arms 14 are secured to the disk by means of bolts 16.

Arranged over the blades 7 is a hood 17, which also forms a cover for the feed-chute 18, (shown in section in Fig. 2,) into which the cut ensilage is deposited after passing the cutters 7. The bottom of the chute 18 is arranged in an arc of a circle and is open at both ends. Located within the chute 18 and mounted in a suitable bearing 19 is a shaft 21, carrying a series of radial and angularly-disposed arms 22, which serve the purpose of beater-arms to agitate the material delivered into the chute 18 as also to propel the material from the chute 18 to the right and into the casing 23, in which the blades 15 are moved. Motion is transmitted to the shaft 21 from shaft 9 by means of the gears 24 on shaft 9, gears 25 on shaft 26, sprocket-wheel 27 on shaft 26, sprocket-chain 28, and sprocket-wheel 29 on shaft 21.

Connected to the forward end of the casing 23, which incloses the blades 15, is a delivery-opening 30. Situated over this delivery-opening is a concave seat 31, and situated in this seat is a convex casting 32, open at its inner end 33 and provided with a hub 34 on its outer end, to which is connected a pipe 35. On the end of this pipe is a bent delivery-nozzle 36.

37 represents guy-ropes for holding the pipe 35 in any required position.

It will be observed that by reason of the construction described the pipe 35 may be lifted out of the hub 34 when it is desired to remove the pipe and without the necessity of releasing any nuts, bolts, &c.; further, that the pipe 35 may be placed at any angle.

Referring to Fig. 3, it will be observed that the casing 23, which is of light material and incloses the blades 15, is secured to the frame by means of four rectangular brackets and bolts 38, and, further, that upon the right-hand lower end of the casing 23 there is arranged an outwardly-projecting bracket 39, carrying a threaded bolt, the lower end of which bears on the top of an adjustable foot 41. The object of this arrangement is to provide means for raising the outer side of the casing 23 to compensate for settling of the casing and to preserve the upper portion of the casing horizontal, and thus maintain the clearage between the interior of the casing and the blades 15, which rotate within it.

The operation of my device will be readily understood: The ensilage, which is fed into the trough, passes the blades 7, is cut, and falls into the chute 18. In the chute it is agitated and fed forward by means of the arms 22 on the shaft 21 and delivered into the cavity of the casing 23. Here it is caught by the blades 15, which also act as blower-arms, and driven forcibly, together with a body of air, upward through the pipe 35 and out through the nozzle 36 and into a suitable tank or into the top of a barn or building where it is desired that the ensilage shall be deposited. It will further be seen that the whole operation of the machine with the exception of feeding the ensilage to the cutter is entirely automatic and that the ensilage from the point where it is cut to the point of delivery is inclosed, so that it will not be subject to the action of strong wind-currents or rain, as is the case where open-bucket elevators are used for elevating.

Having thus described my invention, I claim—

1. The combination with an ensilage-cutter, of a rotary blower having its air-blades mounted on the shaft which carries the cutting-blade of the cutter, a casing for said blower, a chute below said cutter and between said cutter and said casing, and means in said chute for propelling and agitating the ensilage in its passage from the cutter to the blower.

2. The combination with an ensilage-cutter, of a rotary blower having its air-blades mounted on the shaft which carries the cutting-blade of the cutter, a casing for said blower, a chute below said cutter and between said cutter and said casing, means in said chute for propelling and agitating the ensilage in its passage from the cutter to the blower, and a delivery-chute from said casing.

3. The combination with an ensilage-cutter, of a rotary blower having its air-blades mounted on the shaft which carries the cutting-blade of the cutter, a casing for said blower, a chute below the cutter and between said cutter and the bottom of said casing, a shaft in said chute, a series of radial and angularly-disposed arms on said shaft, and interposed means between the parts for producing the required motion of the parts.

4. The combination with an ensilage-cutter, of a rotary blower situated at one side of the cutter and having its air-blades mounted on the shaft which carries the cutting-blades of the cutter, a casing for said blower, a chute located under the cutter, said chute open at one end and communicating with the interior of the casing of the blower at the other end, means in said chute for propelling and agitating the ensilage during its passage through the chute from the cutter to the blower, and a delivery-chute from the blower.

5. The combination with an ensilage-cutter, of a rotary blower, situated at one side of the cutter and having its air-blades mounted on the shaft which carries the cutting-blades of the cutter, a casing for said blower, and means for supporting the casing and adjusting it relative to the air-blades.

In testimony whereof I affix my signature in the presence of two witnesses.

EMMOR W. SILVER.

Witnesses:
F. J. MULLINS,
L. M. KIRTLAN.